Oct. 30, 1945.  E. R. PRICE  2,387,942

TRACTOR-TRAILER BRAKING SYSTEM

Filed June 3, 1944    2 Sheets-Sheet 1

INVENTOR
EARL R. PRICE
BY
ATTORNEY

Oct. 30, 1945.   E. R. PRICE   2,387,942
TRACTOR-TRAILER BRAKING SYSTEM
Filed June 3, 1944   2 Sheets-Sheet 2
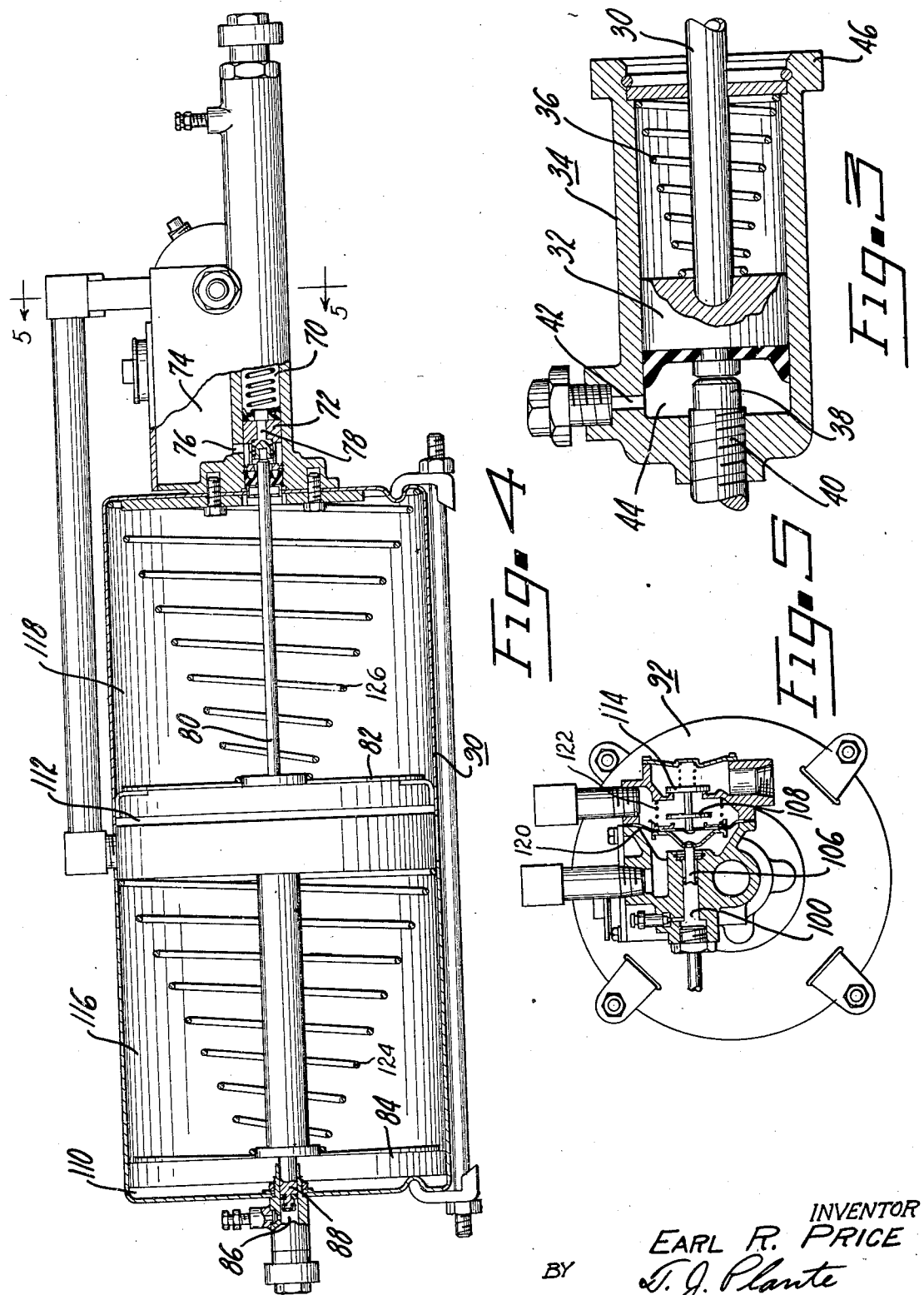
INVENTOR
EARL R. PRICE
BY
T. J. Plante
ATTORNEY Patented Oct. 30, 1945

2,387,942

UNITED STATES PATENT OFFICE 2,387,942

TRACTOR-TRAILER BRAKING SYSTEM

Earl R. Price, South Bend, Ind., assignor to Bendix Aviation Corporation, South Bend, Ind., a corporation of Delaware Application June 3, 1944, Serial No. 538,643

4 Claims. (Cl. 188—3)

This invention relates to tractor-trailer braking systems, wherein the entire system is under the control of a single manually operable member located on the tractor.

It is contemplated that both the tractor and trailer brakes shall be operated hydraulically. This differs from the conventional tractor-trailer braking system primarily in substituting hydraulic brakes on the trailer for the customary vacuum or air brakes. An advantage derived from using hydraulic brakes on the trailer is improved smoothness and better control, due to the use of an incompressible fluid in place of a compressible one. The operator has a better sense of control over the trailer brakes, and the efficiency of the system is increased.

Where hydraulic brake operating motors on the trailer are added to those already present on the tractor, the displacement of fluid required to operate the brakes is greatly increased. In proposals heretofore made for using hydraulic trailer brakes, either this problem has not been met at all, or it has been met by substituting an entirely new tractor hydraulic system for the conventional one.

An object of the present invention is to provide, under the control of the conventional master cylinder on the tractor, a hydraulic brake system having adequate displacement for both the tractor and trailer brakes.

A further object of the present invention is to provide a master cylinder actuated conjointly by power and manual effort and capable of operating both tractor and trailer brakes, which master cylinder is controlled by the operation of a relatively small conventional master cylinder on the tractor.

Other objects and advantages of the present invention will become apparent during the course of the following description, reference being had to the accompanying drawings, in which:

Figure 3 is a section showing part of the coupling unit of Figure 2;

Figure 4 is a section taken through the power and manually operated mechanism for actuating the combined tractor-trailer hydraulic braking system; and Figure 5 is a section taken on the line 5—5 of Figure 4.

Figure 1:
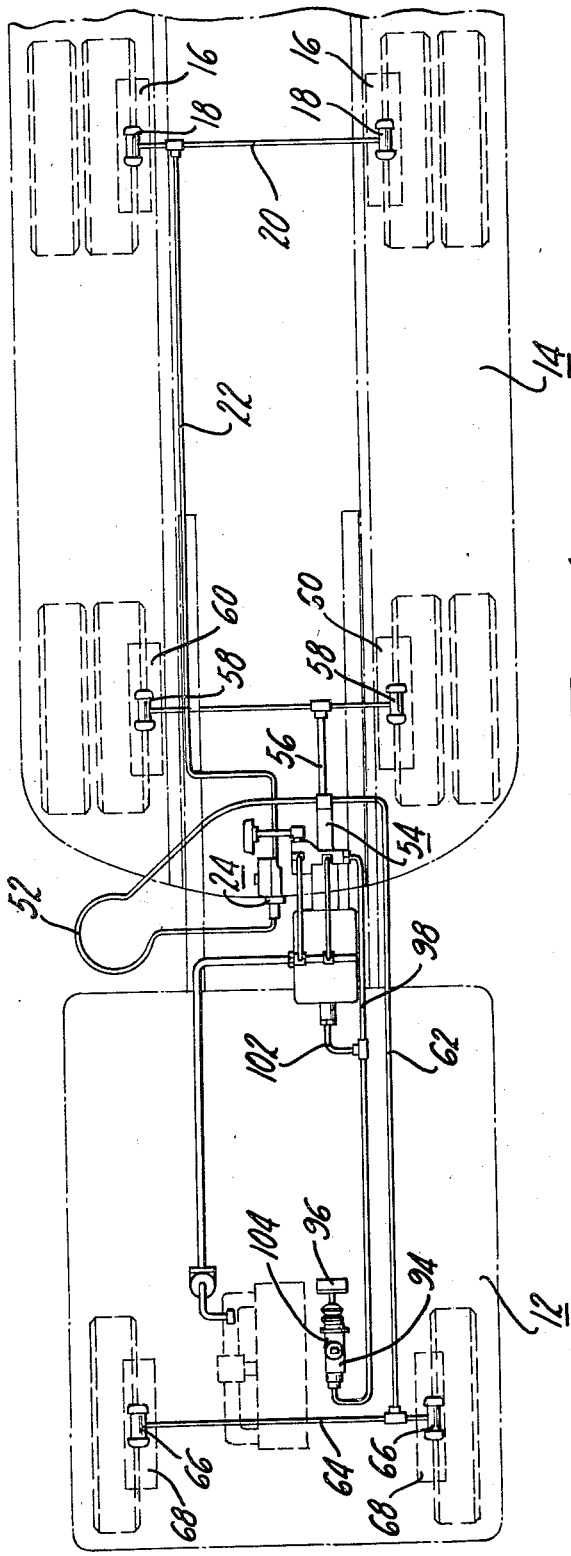
Figure 1 is a diagrammatic showing of a tractor-trailer braking system incorporating my invention.

Referring to Figure 1, a tractor vehicle is indicated generally at 12 and a trailer vehicle at 14. The trailer is provided with a pair of brakes indicated diagrammatically at 16. Each of the trailer brakes is provided with a hydraulic motor 18 for actuating the brake in the well known manner. The hydraulic motors 18 are connected by means of conduits 20 and 22 to a coupling 24, which interconnects the tractor and trailer hydraulic systems.

Figure 2:
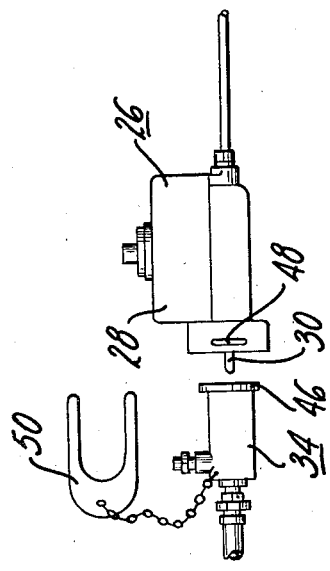
Figure 2 shows in outline the coupling unit which connects the tractor braking system to the trailer braking system.

Referring to Figure 2, the coupling comprises a master cylinder 26, which may be of conventional construction. This master cylinder includes a reservoir portion 28, which is adapted to supply fluid to the trailer brake system through the conventional compensating port when the piston of the master cylinder 26 is in released position. The piston of master cylinder 26 is mechanically connected by means of a rod 30 with the piston 32 (see Fig. 3) of a hydraulic motor 34 which is removably coupled to the master cylinder 26. A spring 36 may be located between piston 32 and the wall of motor 34 in order to normally retain the piston in released position. In released position of said piston, it may rest against an abutment 38 provided by a hollow plug 40 screwed into the end of the motor. A bleed opening 42 may be provided at the top of chamber 44 formed between piston 32 and the left wall of motor 34. A flange 46 may be provided at the right end of motor 34, and a groove 48 may be provided in each side of the master cylinder 26, in order that a U-shaped locking yoke 50 may be used to couple the motor and master cylinder. With this arrangement the hydraulic system of the tractor which communicates with the motor 34 is connected by mechanical means only with the piston of the master cylinder 26, which is located on the trailer and in communication with the trailer brakes. Therefore, when it is desired to disengage the particular tractor from the particular trailer, the motor 34 and master cylinder 26 may be uncoupled without the loss of fluid from the system. Either the tractor or the trailer may thereafter be coupled with another vehicle in a similar manner.

Chamber 44 of motor 34 is connected by means of conduit 52 with the outlet or discharge end of a master cylinder 54. The master cylinder 54 is also connected by means of a conduit 56 with a pair of hydraulic motors 58 which are arranged to operate the rear brakes of the tractor vehicle, shown diagrammatically at 60. Furthermore, master cylinder 54 is connected by means of conduits 62 and 64 with a pair of hydraulic motors or wheel cylinders 66 which are arranged to operate the front brakes of the tractor vehicle, shown diagrammatically at 68.

The master cylinder 54, which is sufficiently large, in length and in cross section, to displace fluid for actuating both tractor and trailer brakes, is operated by a combination of manual and power-created pressure.

The construction of master cylinder 54 and of the means for creating pressure therein is illustrated in Fig. 4. Said master cylinder has a large volume bore 70, in which a piston 72 is reciprocable. A liquid reservoir 74, located above the bore 70, is adapted to supply fluid to the hydraulic system to compensate for changes in volume of the liquid therein, said reservoir being in communication with bore 70 by means of compensation port 76, and passage 78 through piston 72, so long as rod 80 remains in retracted position. Rod 80 is adapted to be moved forward to first close the passage through piston 72, and then move the piston on its pressure stroke, the pressure on rod 80 being developed by means of a pressure differential created over the tandem pistons 82 and 84, and additionally by means of hydraulic pressure created in expansible chamber 86 and acting against a piston 88 which is mechanically connected to rod 80. For a more complete description of the structure and operation of master cylinder 54, power cylinder 90 (which houses the pistons 82 and 84), and expansible chamber 86, reference may be had to the application of Thomas and Price, Serial No. 504,854, filed October 4, 1943, wherein Figures 1 and 2 show a booster unit similar to the one disclosed in the present application.

Figure 5 is a sectional view of the valve means 92 which controls operation of power cylinder 90. Reference may also be had to the aforesaid application Serial No. 504,854 to obtain a detailed description of the valve 92 and its operation.

A conventional master cylinder 94, located in the tractor 12, and operated by the usual brake pedal 96 is connected by means of a conduit 98 to chamber 100 in the valve 92. In addition, a branch conduit 102 connects master cylinder 94 to the expansible chamber 86.

Master cylinder 94 is provided with the usual liquid reservoir 104, which supplies fluid to the conduits 98 and 102 during the time when master cylinder 94 remains in released or retracted position.

When the operator desires to actuate the tractor and trailer brakes, he depresses the pedal 96, creating pressure in master cylinder 94, and forcing liquid therefrom both to expansible chamber 86 and the valve operating chamber 100. The pressure of fluid in chamber 86 acts against piston 88 creating a direct pressure on rod 80, tending to move the same forward to first close passage 78 and thereafter move piston 72 on its pressure stroke. It will be noted that the diameter of piston 88, or in other words its effective cross-sectional area, is much less than that of piston 72. This is necessary because the manually operated master cylinder 94 has a relatively small volume, whereas the master cylinder 54 must have a volume sufficient to apply both tractor and trailer brakes.

At the same time pressure fluid entering chamber 100 in the valve device 92 moves piston 106 to the right (as seen in Figure 5), first seating poppet 108 to cut off communication between chambers 110 and 112 of the power cylinder and a source of vacuum (such as the intake manifold), and subsequently moving poppet 114 from its seat to admit air at atmospheric pressure to said chambers 110 and 112. Since the chambers 116 and 118, which are ahead of the respective pistons 84 and 82, remain connected to the vacuum source, a pressure differential is created over pistons 82 and 84, moving them toward the right (as seen in Fig. 4), thus greatly increasing the force acting through rod 80 against piston 72.

Piston 72 is therefore moved forward conjointly by the power created pressure of power cylinder 90 and the manually created pressure of master cylinder 94 to displace fluid under pressure through conduits 52, 56 and 62 to apply the tractor and trailer brakes. In the case of the tractor brakes, the conduits 56 and 62 are in direct communication with the motors 58 and 66 respectively. However, in the case of the trailer brakes, the pressure and movement of fluid in conduit 52 are transmitted to the conduit 22 only through the mechanical medium of motor 34 and master cylinder 26.

As a pressure differential is developed over the pistons of power cylinder 90, a corresponding pressure differential is built up over diaphragm 120. This results in a "reaction" force acting through piston 106 against the pressure developed by the operator in chamber 100. As the differential over the power cylinder pistons increases, the differential over diaphragm 120 also increases, thereby developing a progressively increasing reaction force which indicates to the operator the extent of brake application. The operator is further informed as to the extent of brake application because it is necessary for him to follow up with pedal 96 in order to displace additional fluid to chamber 86 as piston 88 moves on the pressure stroke. Therefore, unless the operator continues to displace fluid from master cylinder 94 and continues to increase the manual force applied to pedal 96, valve element 114 will return to its seat, bringing the valve mechanism to lapped position. In this position, the brake applying effort will neither increase nor decrease but will remain the same in intensity until the operator either depresses the pedal further or releases it. When the operator releases the manually applied pressure, diaphragm 120 will be moved away from valve element 108 by means of spring 122, and the pressure differential over the pistons in the power cylinder will be destroyed, thereby permitting springs 124 and 126 to return the power pistons and piston 88 to released position. Fluid will, of course, flow back from the brakes to cylinder 70, and the hydraulic system will be restored to its original status.

From the above, it will be appreciated that I have provided a power and manually operated hydraulic master cylinder 54 having sufficient fluid displacement to operate both tractor and trailer brakes, which is itself controlled by a manually operated master cylinder having much less than the required displacement. Nevertheless, there is no danger of failure of the brakes due to "bottoming" of the piston in the manually operated master cylinder.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. A power braking system for a tractor and trailer vehicle combination comprising brakes on the tractor, hydraulic means for operating the tractor brakes, brakes on the trailer, hydraulic means for operating the trailer brakes, a large displacement master cylinder operatively connected to both of said hydraulic means, said master cylinder having sufficient displacement to operate both tractor and trailer brakes, a power cylinder adapted to create pressure in said master cylinder, valve mechanism controlling said power cylinder, a hydraulic motor operating said valve mechanism, a manually operable low displacement, master cylinder in communication with said motor to actuate the same, an expansible chamber also in communication with said manually operable master cylinder, said expansible chamber being operatively associated with the large displacement master cylinder in such a way that the pressure of liquid in the expansible chamber increases the pressure in the large displacement master cylinder and the volume of the expansible chamber increases proportionately to the decreasing volume of the large displacement master cylinder, a compensating passage associated with a liquid reservoir and in communication with the manually operable master cylinder when the piston of the same is in retracted position, and a second compensating passage independent of the first and arranged to provide communication between a liquid reservoir and the large displacement master cylinder when the piston of the same is in retracted position.

2. A power braking system for a tractor and trailer vehicle combination comprising brakes on the tractor, hydraulic means for operating the tractor brakes, brakes on the trailer, hydraulic means for operating the trailer brakes, a master cylinder having a relatively large diameter bore connected to both of said hydraulic means, said master cylinder having sufficient displacement to operate both tractor and trailer brakes, a power cylinder adapted to exert effort to displace fluid under pressure from said master cylinder, valve mechanism under the control of the operator for actuating said power cylinder, a relatively small diameter chamber having a piston therein which is operatively associated with the large diameter master cylinder whereby the pressure of liquid in said chamber exerts an effort which assists the power cylinder in displacing fluid under pressure from said master cylinder and the volume of the chamber increases proportionately to the decrease in volume of the master cylinder during its applying stroke, and a manually operated low displacement master cylinder in communication with said chamber.

3. A power braking system for a tractor and trailer vehicle combination comprising brakes on the tractor, hydraulic means for operating the tractor brakes, brakes on the trailer, hydraulic means for operating the trailer brakes, a master cylinder having a relatively large effective cross-sectional area and operatively connected to both of said hydraulic means, said master cylinder having sufficient displacement to operate both tractor and trailer brakes, a power operated booster adapted to exert effort to displace fluid under pressure from said master cylinder, an operator operated low displacement master cylinder, valve mechanism controlling said booster and itself controlled by said operator operated master cylinder, an expansible chamber in communication with the operator operated master cylinder and having a relatively small effective cross-sectional area in relation to the cross-sectional area of the first-mentioned master cylinder, said expansible chamber being operatively associated with said first-mentioned master cylinder in such a way that the pressure of liquid in the expansible chamber exerts an effort which assists the booster in displacing fluid under pressure from the master cylinder and the volume of the expansible chamber increases proportionately to the decrease in volume of the master cylinder during its applying stroke, a compensating passage associated with a liquid reservoir and in communication with the operator operated master cylinder when the piston of the same is in retracted position, and a second compensating passage independent of the first and arranged to provide communication between a liquid reservoir and the first-mentioned master cylinder when the piston of the same is in retracted position.

4. A power braking system for a tractor and trailer vehicle combination comprising brakes on the trailer, hydraulic means for operating the trailer brakes, a master cylinder mounted on the trailer and in communication with said hydraulic trailer brake operating means for actuating the same, a fluid reservoir mounted on the trailer and in communication with the aforesaid master cylinder when the same is in released position, brakes on the tractor, hydraulic means for operating the tractor brakes, a second master cylinder mounted on the tractor and in communication with said hydraulic tractor brake operating means for actuating the same, said second master cylinder having a relatively large effective cross-sectional area, a motor operatively connected by means of a removable coupling to the trailer master cylinder and in communication with said second master cylinder, said second master cylinder displacing fluid to operate both tractor and trailer brakes, a fluid reservoir adjacent said second master cylinder and in communication with the same while it remains released, a power operated booster adapted to exert effort to displace fluid under pressure from said second master cylinder, an operator operated low displacement master cylinder on the tractor, a fluid reservoir adjacent said operator operated master cylinder and in communication with the same while it remains released, valve mechanism controlling said booster and itself controlled by the displacement of fluid from said operator operated master cylinder, and an expansible chamber in communication with the operator operated master cylinder and having a relatively small effective cross-sectional area in relation to said second master cylinder, said expansible chamber being operatively associated with said second master cylinder whereby the pressure of liquid in the expansible chamber exerts an effort which assists the booster in displacing fluid under pressure from said second master cylinder and the volume of the expansible chamber increases proportionately with the decrease in volume of said second master cylinder during its applying stroke.

EARL R. PRICE.